UNITED STATES PATENT OFFICE.

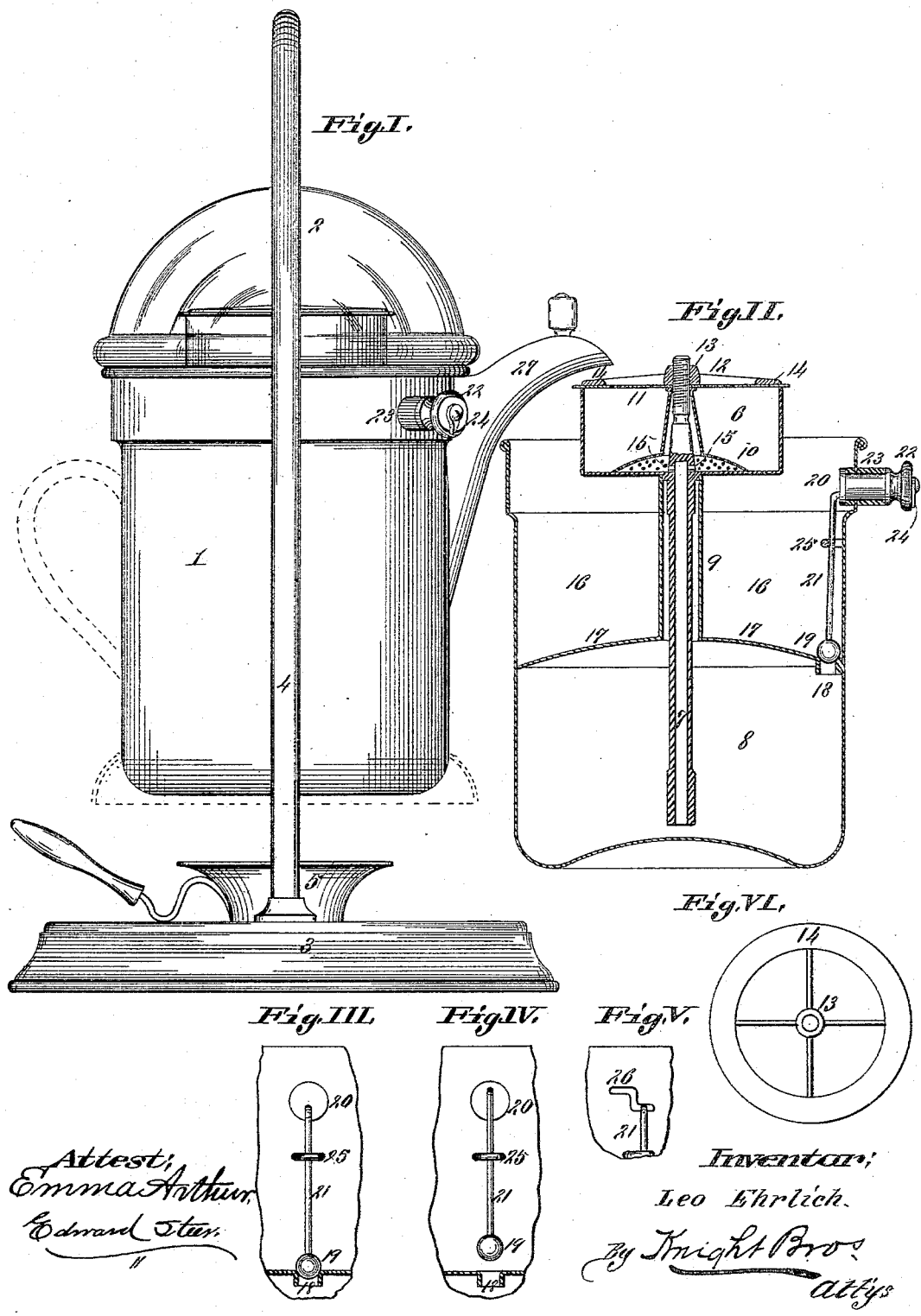

LEO EHRLICH, OF ST. LOUIS, MISSOURI.

COFFEE-POT.

SPECIFICATION forming part of Letters Patent No. 378,296, dated February 21, 1888.

Application filed June 14, 1887. Serial No. 241,283. (No model.)

*To all whom it may concern:*

Be it known that I, LEO EHRLICH, of the city of St. Louis, in the State of Missouri, have invented a certain new and useful Improvement in Coffee-Pots, of which the following is a full, clear, and exact description, reference being had to the accompanying drawings, forming part of this specification, and in which—

Figure I is a side view of my improved coffee-pot. Fig. II is a vertical longitudinal section with the dome removed. Fig. III is a detail view showing the valve closed. Fig. IV is a like view showing the valve opened. Fig. V shows a modification of the attachment to operate the valve. Fig. VI is a top view of the spider.

My invention is an improvement on the well-known Vienna coffee-pot; and it consists in features of novelty hereinafter fully described, and pointed out in the claim.

Referring to the drawings, 1 represents the body of a coffee-pot, and 2 a dome-shaped cover.

3 is a base to which is attached a frame, 4, the coffee-pot being pivoted to the frame, in order that it may be readily tipped.

5 is a vessel to hold alcohol or other combustible liquid to heat the coffee.

6 is a receptacle in which the ground coffee is placed, and to which is attached a tube, 7, which communicates with a chamber, 8, in the lower part of the coffee-pot.

9 is a sleeve or pipe which supports the coffee-holding receptacle and through which the tube 7 passes. The tube 7 extends up through the receptacle 6, and its upper end is closed, and is screw-threaded for a short distance.

10 is a perforated disk which is slipped over the tube 7 and rests on the bottom of the receptacle 6.

11 is a strainer placed over the tube 7, and which rests upon the top of the receptacle 6. It is held in place by a spider, 12, having a screw-threaded hub, 13, that fits on the upper end of the tube 7, and a ring, 14, that fits on the outer edge of the strainer.

15 are openings in the tube 7 to permit the passage of steam and water from the chamber 8 to the receptacle through the disk 10, and from here the steam and water pass through the ground coffee, through the strainer 11, and into an upper chamber, 16. The upper chamber, 16, is separated from the lower one by a partition, 17, and the sleeve 9.

18 is an opening in the partition, forming a communication between the upper and lower chambers. It is provided with a valve, 19, connected to an eccentric, 20, by a stem, 21. The eccentric is connected to the inner end of a knob, 22. The knob works in a journal, 23, secured to the wall of the coffee-pot near the top.

24 is an index-finger secured to the outer face of the knob, and which indicates whether the valve is open or closed, according to whether it is pointing up or down.

25 is a staple which holds the valve-stem from lateral movement.

Fig. V represents a modification of the eccentric, which consists of a body having a slot, 26, with which the valve-stem connects.

27 represents the spout of the pot communicating with the chamber 16.

The operation is as follows: Water is placed in the chamber 8 and the ground coffee in the receptacle 6. When the water becomes heated, the steam and water pass up through the tube 7, out at the openings 15, and through the disk 10 into the receptacle 6, where it comes in contact with the coffee, after which it passes out through the strainer 11, and then falls into the chamber 16, and is then ready to be served. My improvement consists in making the opening 18 through the partition 17 and providing the valve to close this opening. It often occurs that one passage of the water through the coffee will not sufficiently distill the coffee, and by my improvement the coffee can be returned to the chamber 8 and the operation repeated, all that is necessary to be done being to open the valve until the liquid has passed from the chamber 16 to the chamber 8, and then to close the valve.

By the use of the valve any strength of coffee can be made, enabling one to get four to five different strengths of coffee out of one brewing.

The pot may be provided with a handle, as shown in dotted lines, Fig. I, and a base, also shown in dotted lines, Fig. I, by which it may be used, if desired, as an ordinary coffee-pot by setting it on the stove.

I claim as my invention—

In a coffee-pot, the combination of the body, perforated partition located in the body and dividing it into two chambers, tube passing through the partition into the lower chamber and open at its lower end, chamber for holding the ground coffee, located on the upper end of the tube and communicating therewith, a valve for controlling the opening in the partition, and means for operating the valve, consisting of an eccentric provided with a turning knob and a rod connecting the eccentric to the valve, substantially as and for the purpose set forth.

LEO EHRLICH.

In presence of—
  JOS. WAHLE,
  EDW. S. KNIGHT.